US012681288B2

(12) United States Patent
Allen

(10) Patent No.: US 12,681,288 B2
(45) Date of Patent: Jul. 14, 2026

(54) PERVASIVE LOCATION FIDUCIAL PATHOLOGY

(71) Applicant: IRON MOUNTAIN INCORPORATED, Portsmouth, NH (US)

(72) Inventor: William J. Allen, Corvallis, OR (US)

(73) Assignee: Iron Mountain Incorporated, Portsmouth, NH (US)

( * ) Notice: Subject to any disclaimer, the term of this patent is extended or adjusted under 35 U.S.C. 154(b) by 0 days.

(21) Appl. No.: 18/902,452

(22) Filed: Sep. 30, 2024

(65) Prior Publication Data

US 2026/0093101 A1     Apr. 2, 2026

(51) Int. Cl.

| | |
|---|---|
| *G02B 21/34* | (2006.01) |
| *G02B 21/00* | (2006.01) |
| *G02B 21/36* | (2006.01) |
| *G06T 7/73* | (2017.01) |
| *H04N 23/56* | (2023.01) |
| *H04N 23/63* | (2023.01) |
| *H04N 23/74* | (2023.01) |
| *G06K 7/14* | (2006.01) |

(52) U.S. Cl.
CPC ......... *G02B 21/34* (2013.01); *G02B 21/0036* (2013.01); *G02B 21/36* (2013.01); *G06T 7/73* (2017.01); *H04N 23/56* (2023.01); *H04N 23/631* (2023.01); *H04N 23/74* (2023.01); *G06K 7/1417* (2013.01); *G06T 2200/24* (2013.01); *G06T 2207/10056* (2013.01); *G06T 2207/20104* (2013.01); *G06T 2207/30204* (2013.01)

(58) Field of Classification Search
CPC .... G02B 21/34; G02B 21/0036; G02B 21/36; G06T 7/73; G06T 2200/24; G06T 2207/10056; G06T 2207/20104; G06T 2207/30204; H04N 23/74; H04N 23/56; H04N 23/631; G06K 7/1417
See application file for complete search history.

(56) References Cited

U.S. PATENT DOCUMENTS

| | | | |
|---|---|---|---|
| 2006/0104499 A1* | 5/2006 | Zahniser | G06T 7/0012 382/141 |
| 2018/0356621 A1* | 12/2018 | Ward | G02B 21/367 |
| 2019/0101736 A1* | 4/2019 | Chen | H04N 23/56 |

* cited by examiner

*Primary Examiner* — Eileen M Adams
(74) *Attorney, Agent, or Firm* — Kilpatrick Townsend & Stockton LLP

(57) ABSTRACT

A digital pathology system receives, via a user interface, a selection of a LOI in a camera view of a PLFP slide under a first optical condition. The PLFP slide is configured to reveal a fiduciary pattern when exposed to a second optical condition that is different from the first optical condition. Responsive to receiving a request, digital pathology system changes optical conditions from the first optical condition to the second optical condition to reveal the fiducial pattern on the PLFP slide, which defines absolute coordinates for the PLFP slide. The digital pathology system determines coordinates for the location of interest based on the revealed fiducial pattern. The digital pathology system displays, in the camera view, the determined coordinates.

17 Claims, 7 Drawing Sheets

PLFP SLIDE 200 (E.G. 101)
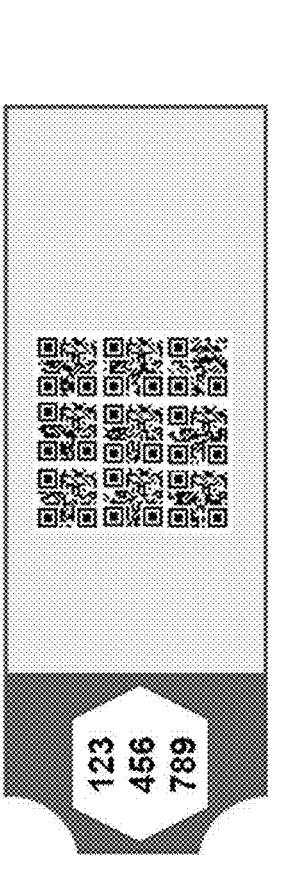
PLFP SLIDE 200 with fiducial pattern 102
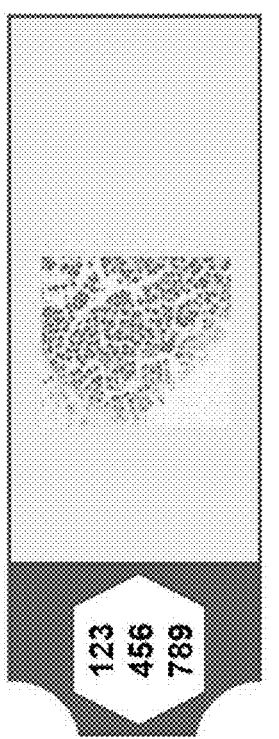
PLFP SLIDE 200 under optical condition 201
(e.g. fiducial pattern 102 revealed)
*FIG. 2*

Figure 3:
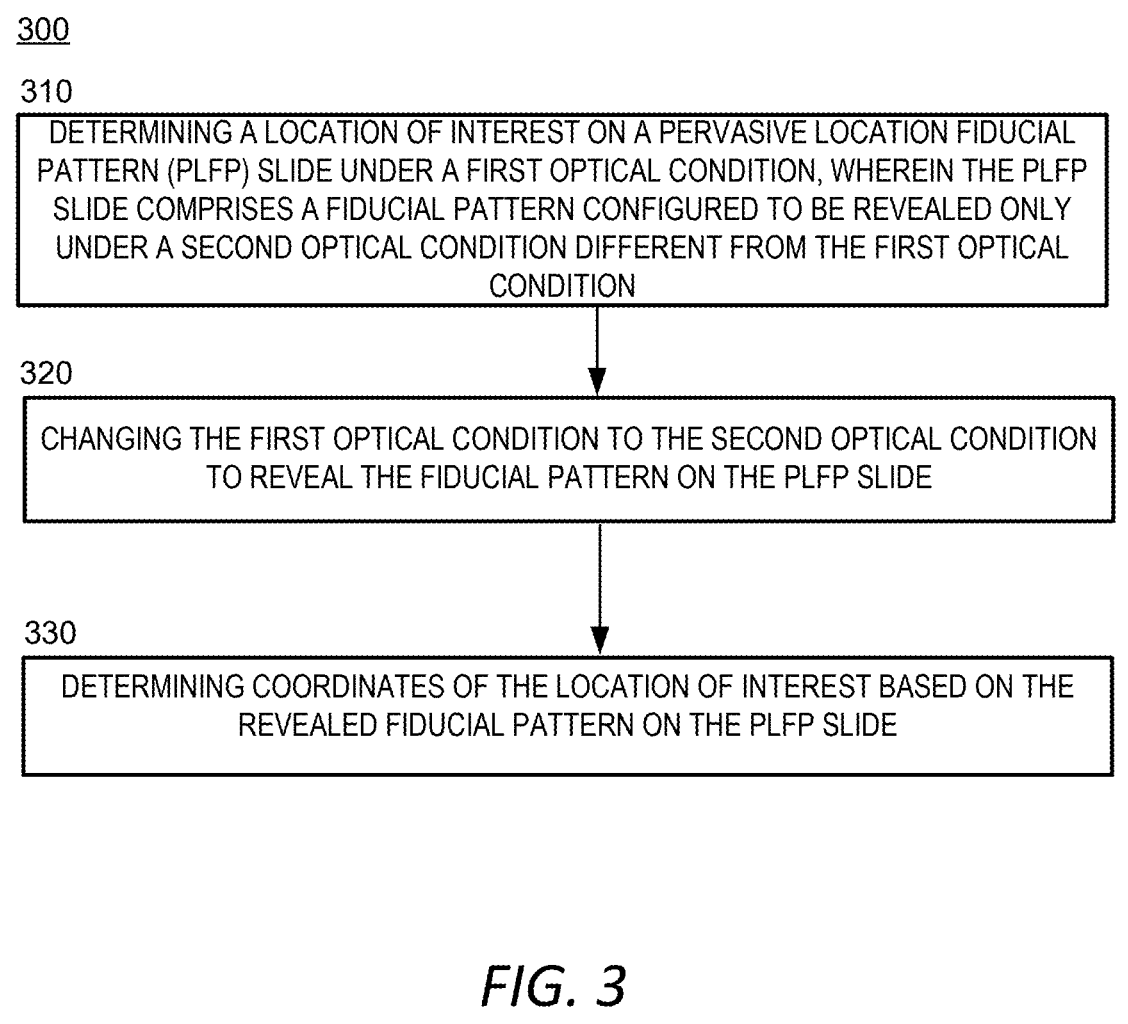

300

310

DETERMINING A LOCATION OF INTEREST ON A PERVASIVE LOCATION FIDUCIAL PATTERN (PLFP) SLIDE UNDER A FIRST OPTICAL CONDITION, WHEREIN THE PLFP SLIDE COMPRISES A FIDUCIAL PATTERN CONFIGURED TO BE REVEALED ONLY UNDER A SECOND OPTICAL CONDITION DIFFERENT FROM THE FIRST OPTICAL CONDITION

320

CHANGING THE FIRST OPTICAL CONDITION TO THE SECOND OPTICAL CONDITION TO REVEAL THE FIDUCIAL PATTERN ON THE PLFP SLIDE

330

DETERMINING COORDINATES OF THE LOCATION OF INTEREST BASED ON THE REVEALED FIDUCIAL PATTERN ON THE PLFP SLIDE

Figure 4:
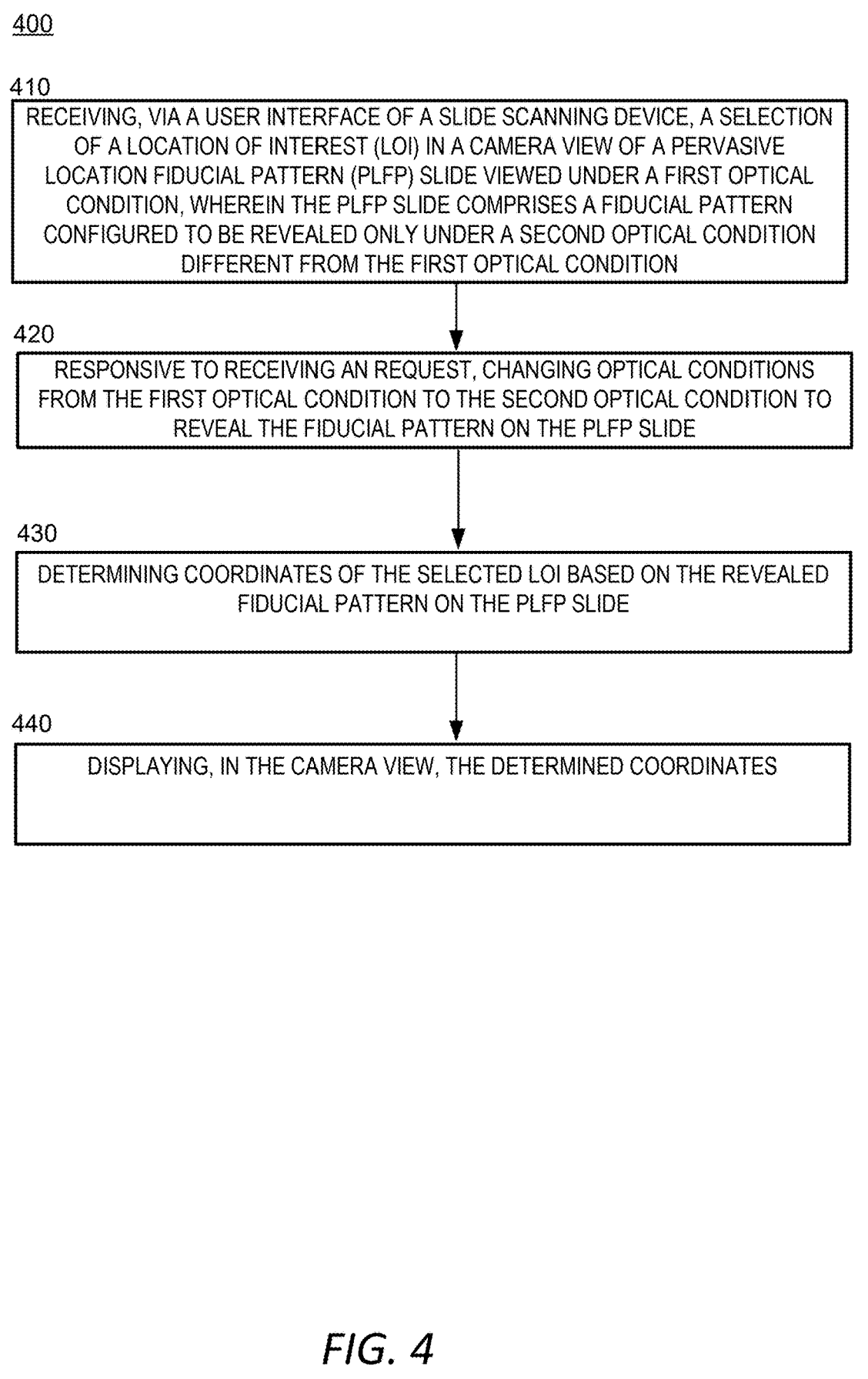

RECEIVING, VIA A USER INTERFACE OF A SLIDE SCANNING DEVICE, A SELECTION OF A LOCATION OF INTEREST (LOI) IN A CAMERA VIEW OF A PERVASIVE LOCATION FIDUCIAL PATTERN (PLFP) SLIDE VIEWED UNDER A FIRST OPTICAL CONDITION, WHEREIN THE PLFP SLIDE COMPRISES A FIDUCIAL PATTERN CONFIGURED TO BE REVEALED ONLY UNDER A SECOND OPTICAL CONDITION DIFFERENT FROM THE FIRST OPTICAL CONDITION

420

RESPONSIVE TO RECEIVING AN REQUEST, CHANGING OPTICAL CONDITIONS FROM THE FIRST OPTICAL CONDITION TO THE SECOND OPTICAL CONDITION TO REVEAL THE FIDUCIAL PATTERN ON THE PLFP SLIDE

430

DETERMINING COORDINATES OF THE SELECTED LOI BASED ON THE REVEALED FIDUCIAL PATTERN ON THE PLFP SLIDE

440

DISPLAYING, IN THE CAMERA VIEW, THE DETERMINED COORDINATES

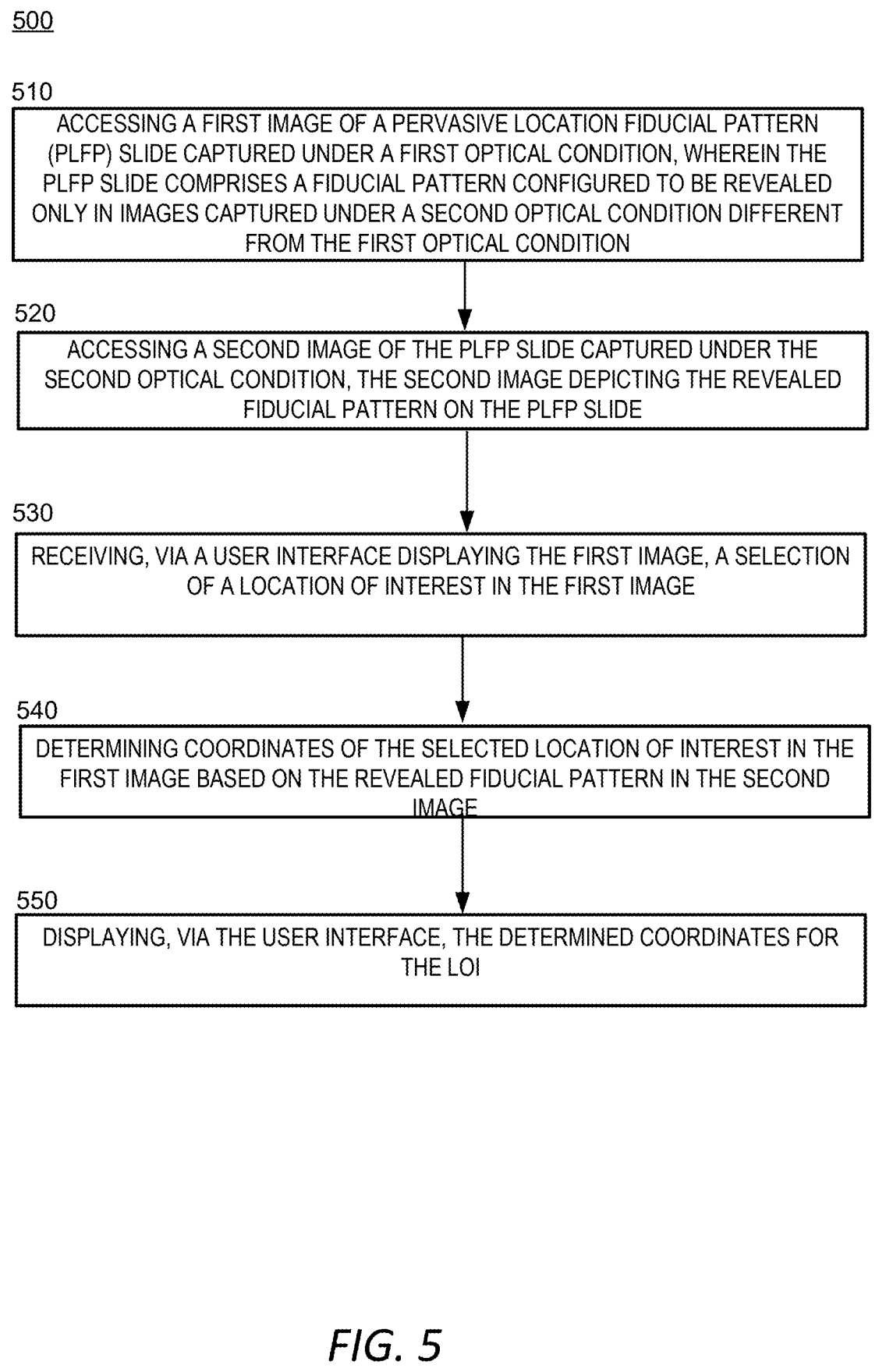

ACCESSING A FIRST IMAGE OF A PERVASIVE LOCATION FIDUCIAL PATTERN (PLFP) SLIDE CAPTURED UNDER A FIRST OPTICAL CONDITION, WHEREIN THE PLFP SLIDE COMPRISES A FIDUCIAL PATTERN CONFIGURED TO BE REVEALED ONLY IN IMAGES CAPTURED UNDER A SECOND OPTICAL CONDITION DIFFERENT FROM THE FIRST OPTICAL CONDITION

520

ACCESSING A SECOND IMAGE OF THE PLFP SLIDE CAPTURED UNDER THE SECOND OPTICAL CONDITION, THE SECOND IMAGE DEPICTING THE REVEALED FIDUCIAL PATTERN ON THE PLFP SLIDE

530

RECEIVING, VIA A USER INTERFACE DISPLAYING THE FIRST IMAGE, A SELECTION OF A LOCATION OF INTEREST IN THE FIRST IMAGE

540

DETERMINING COORDINATES OF THE SELECTED LOCATION OF INTEREST IN THE FIRST IMAGE BASED ON THE REVEALED FIDUCIAL PATTERN IN THE SECOND IMAGE

550

DISPLAYING, VIA THE USER INTERFACE, THE DETERMINED COORDINATES FOR THE LOI

*FIG. 5*

PERVASIVE LOCATION FIDUCIAL PATHOLOGY

TECHNICAL FIELD

This disclosure generally relates to techniques for coordinate systems in microscope slide pathology. More specifically, but not by way of limitation, this disclosure relates to improving coordinate determination in microscope slides by providing a coordinate system embedded in the microscope slide itself.

BACKGROUND

Conventional coordinate systems for microscopic slide analysis are generally located on a stage of a microscope and vary according to the specific instrument/model. Even on a single microscope unit, a single location on a slide may appear in a different location in the instrument-specific coordinate plane depending on how the user physically registers (e.g., affixes) the slide to the stage. Such conventional mechanical coordinate system solutions are therefore not useful for viewing the same slide in multiple microscopes or even on the same microscope if the slide is removed and then re-registered. Further, conventional digital coordinate systems (e.g., a pixel coordinate system in a captured image of a slide) are specific to each captured image of the slide.

SUMMARY

The present disclosure describes techniques for providing an absolute digital coordinate system for digital-image-based slide analysis via a slide configured with an optically-revealable pervasive location fiducial pattern. In certain embodiments, a location of interest (LOI) is on a pervasive location fiducial pattern (PLFP) slide is identified under a first optical condition. The PLFP slide is configured to reveal a fiduciary pattern when exposed to a second optical condition that is different from the first optical condition. The first optical condition is changed to a second optical condition to visibly reveal the fiducial pattern on the PFLP slide. Absolute coordinates of the LOI on the slide are determined based on the revealed fiducial pattern.

In certain embodiments, a digital pathology system receives, via a user interface, a selection of a LOI in a camera view of a PLFP slide under a first optical condition. The PLFP slide is configured to reveal a fiduciary pattern when exposed to a second optical condition that is different from the first optical condition. Responsive to receiving a request, digital pathology system changes optical conditions from the first optical condition to the second optical condition to reveal the fiducial pattern on the PLFP slide, which defines absolute coordinates for the PLFP slide. The digital pathology system determines coordinates for the location of interest based on the revealed fiducial pattern. The digital pathology system displays, in the camera view, the determined coordinates.

In certain embodiments, a digital pathology system accesses a first image of a PFLP slide captured under a first optical condition. The PLFP slide is configured to reveal a fiduciary pattern when exposed to a second optical condition that is different from the first optical condition. The digital pathology system accesses a second image of the PLFP slide captured under the second optical condition including the revealed fiducial pattern. The digital pathology system receives, via a user interface displaying the first image, a selection of a LOI in the first image. The digital pathology system determines coordinates of the selected LOI based on the revealed fiducial pattern in the second image. The digital pathology system displays, via the user interface, the determined coordinates.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 illustrates a slide configured with an optically-revealable pervasive location fiducial pattern, according to certain embodiments disclosed herein.

FIG. 3 depicts a method for determining coordinates for a location of interest on a slide configured with an optically-revealable pervasive location fiducial pattern, according to certain embodiments disclosed herein.

FIG. 4 depicts a method for determining, by a digital pathology system, coordinates for a location of interest in a camera view a slide configured with an optically-revealable pervasive location fiducial pattern, according to certain embodiments disclosed herein.

FIG. 5 depicts a method for determining, by a digital pathology system, coordinates for a location of interest in an image of a slide configured with an optically-revealable pervasive location fiducial pattern, according to certain embodiments described herein.

DETAILED DESCRIPTION

Figure 1:
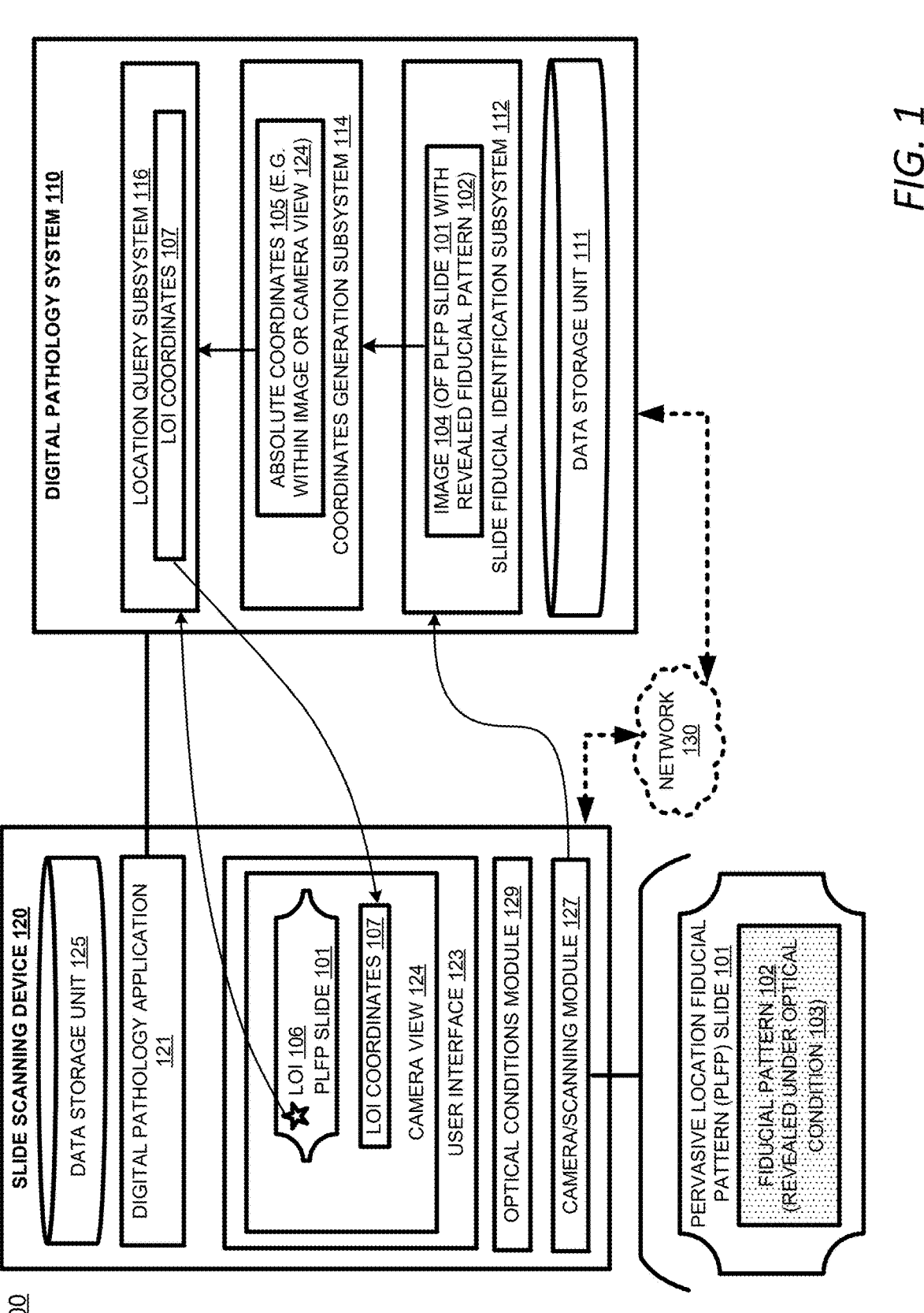
FIG. 1 depicts an example of a computing environment for providing an absolute digital coordinate system for digital-image-based slide analysis via a slide configured with an optically-revealable pervasive location fiducial pattern, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

In conventional microscopy, a microscope stage is configured with a coordinate system and a user of the microscope prepares a slide and manually registers it to the stage. While viewing the registered slide via the microscope, the user may then identify a point or region of interest on the slide in view of the instrument-specific coordinates that are visible on the stage underneath and/or around the slide. However, because conventional coordinate systems are configured on the microscope stage itself, they vary according to the microscope instrument/model. Also, even for a single microscope instrument/model, coordinates for a point of interest on a slide can vary on how the user registers the slide in the microscope stage. Such conventional mechanical coordinate system solutions are therefore not useful for viewing the same slide in multiple microscopes or even on the same microscope if the slide is removed and then re-registered by the same user or another user.

In conventional microscopy, a slide can also be examined via digital images captured of the slide. However, conventional digital coordinate systems (e.g., a pixel coordinate system in a captured image of a slide) are specific to and vary for each captured image of the slide, which can vary based on camera positioning during image capture. Therefore, conventional image-specific coordinate systems are not useful for examining the same slide in multiple images of the slide.

Certain embodiments described herein address the limitations of conventional microscopy systems by providing a slide with a pervasive location fiducial pattern (PLFP) that is configured on the slide itself and that can be used for establishing a coordinate system. The pervasive location fiduciary pattern slide provided herein supports defining a coordinate system for defining LOIs in various images of the slide in an absolute manner does not vary according to the microscope instrument/model used, according to how the user positions the slide during registration, or according to how the image of a slide is captured, as occurs in conventional microscopy systems. The PLFP slide coordinate marking system described herein is designed such that absolute position locations are encoded, at microscopic scale, in a nearly continuous manner. When the fiducial pattern is visible under a predefined optical condition, examining the revealed coordinate marks that appear near the LOI enable determination of a precise absolute location of the LOI. Accordingly, the PFLP slide described herein can be used across multiple microscopes/devices without any sacrifice in the fidelity of LOI coordinates.

The following non-limiting example is provided to introduce certain embodiments. In this example, a digital pathology system receives, via a user interface of a slide scanning device, a selection of a location of interest (LOI) in a camera view of a pervasive location fiducial pattern (PLFP) slide viewed under a first optical condition, wherein the PLFP slide comprises a fiducial pattern configured to be revealed only under a second optical condition different from the first optical condition. For example, the slide scanning device comprises a microscope device. In certain examples, the camera view is a view of a digital camera component of the slide scanning device. In certain examples, the camera view is a user's view through an eyepiece lens of the slide scanning device (e.g., an eyepiece of a microscope). In certain examples, the fiducial pattern comprises a micro-patterned interface token objects (ITOs) encoded in the PLFP slide. In an example, the fiducial pattern comprises a set of quick response (QR) codes arranged (e.g., tiled) across an area on the PLFP slide, each of the QR codes including its own specific grid coordinates. In certain examples, receiving the selection of the LOI comprises receiving a selection of the LOI via a user interface depicting the camera view of the slide scanning device. In certain examples, the first optical condition comprises a view of a first optical plane of the PLFP slide and the second optical condition comprises a view of a second optical plane of the PLFP slide different from the first optical plane.

Responsive to receiving a request, the digital pathology system changes optical conditions on the PLFP slide from the first optical condition to the second optical condition to reveal the fiducial pattern on the PFLP slide. For example, the digital pathology system instructs the slide scanning device to change the optical condition of the PLFP slide from the first optical condition to the second optical condition. Changing the optical conditions, in some instances, comprises reorienting the PLFP slide such that the camera view views the second optical plane of the PLFP slide instead of the first optical plane. Changing the optical conditions, in some instances, comprises changing lighting conditions on the PLFP slide, for example, directing an ultraviolet (UV) light, a fluorescent light, or a specific wavelength of visible light to the PLFP slide from a corresponding light source.

The digital pathology system determines coordinates of the selected LOI based on the revealed fiducial pattern on the PFLP slide. For example, the digital pathology system defines coordinates of the selected LOI in terms of a QR code identifier identifying a specific QR code on the slide and further information defining a specific point or region within the identified QR code. In some instances, the selected LOI is a specific point defined by the coordinates. In some instances, the selected LOI is an area (e.g., circular, rectangular, or other area) defined by the coordinates. The digital pathology system displays, in the camera view, the determined coordinates.

The embodiments described herein, specifically configuring the PLFP slide with a fiducial pattern, enables an entity (e.g., a person or a computing system) examining a pathology microscope slide to record absolute coordinates of a feature of interest encountered on the slide. As previously discussed, in conventional systems, coordinates are configured on the microscope stage itself and, therefore, the coordinates vary based on how the user registers the slide (e.g., the position and alignment of the slide with respect to the stage coordinates). Such conventional coordinates are therefore not absolute coordinates. On the other hand, the absolute coordinates generated using the methods described herein do not vary based on the microscope or camera instruments used to view the slide nor do they vary based on how the user registers a slide, significantly improving an accuracy of the coordinates generated using the methods described herein compared to conventional coordinate systems, which do vary based on the instruments used and also on how the slide is registered.

Example Operating Environment for Providing an Absolute Digital Coordinate System for Digital-Image-Based Slide Analysis Via a Slide Configured With an Optically-Revealable Pervasive Location Fiducial Pattern Referring now to the drawings, FIG. 1 depicts an example of a computing environment 100 for providing an absolute digital coordinate system for digital-image-based slide analysis via a slide configured with an optically-revealable pervasive location fiducial pattern. In certain embodiments, the computing environment 100 includes a slide scanning device 120 and the digital pathology system 110, including a slide fiducial identification subsystem 112, a coordinates generation subsystem 114, and a location query subsystem 116, is a component of a digital pathology application 121 that executes on the slide scanning device 120. In certain embodiments, the computing environment 100 includes the slide scanning device 120 and the digital pathology system 110 that communicates via a network 120 with the slide scanning device. In certain embodiments, each of the slide fiducial identification subsystem 112, a coordinates generation subsystem 114, and a location query subsystem 116 is a network server or other computing device connected to a network 130.

In certain embodiments, the slide fiducial identification subsystem 112 receives images of a pervasive location fiducial pattern (PLFP) slide 101. In certain examples, the images of the PLFP slide 101 comprise a live camera view 124 including multiple frames which capture the PLFP slide 101. In some instances, the images or the multiple frames include an image/frame under a first optical condition.

In certain embodiments, the coordinates generation subsystem 114 determines absolute coordinates 105 within the image 104 or camera view 124 based on the fiduciary pattern 102. For example, the coordinates generation subsystem 114 associates each pixel of the image 104 or of the current camera view 124 with an associated coordinate in the fiducial pattern 102. In some instances, the fiducial pattern 102 comprises a grid of QR codes and defines coordinates in terms of a QR code identifier identifying a specific QR code on the slide and further information defining a specific point or region within the identified QR code.

In certain instances, the location query subsystem 116 receives an indication of a location of interest (LOI) 106 in the image or in the live camera view 124. For example, the user of a slide scanning device 120 with which the user captures the image 104 of the PLFP slide 101 or through which the user is viewing the live camera view 124 of the PLFP slide 101 provides an input to the slide scanning device 120 indicating the LOI 106. For example, the user clicks, touches, or otherwise interacts with the user interface 123 of the slide scanning device 120 to indicate the LOI 106 in the image 104 or in the live camera view 124 of the user interface 123. The location query subsystem 116 determines a location defined in terms of the revealed fiduciary pattern 102 corresponding to the selected LOI 106 in the image 104 or in the live camera view 124. For example, the location query subsystem 116 identifies a pixel associated with the selected LOI 106 and determines, based on the absolute coordinates 105, coordinates 107 for the LOI 106 as defined by the fiducial pattern 102. For example, the location could be a QR code identifier (identifying a specific QR code of the multiple QR codes in the fiduciary pattern 102), and further information defining a specific location within the QR code associated with the QR code identifier. In certain embodiments, the slide scanning device 120, responsive to receiving a selection of a LOI 106 in the camera view 124 or within the image 104, displays, via the user interface 124, the coordinates 107 determined by the location query subsystem 116 in the camera view 124 or in the image, respectively.

The digital pathology system 110 includes a data storage unit 111. An example data storage unit 111 is accessible to the digital pathology system 110 and stores data for the digital pathology system 110. In some instances, the data storage unit 111 stores an image 104 of a PLFP slide 101 captured by the slide scanning device 120. In some instances, the image 104 comprises an image of the PLFP slide 101 captured under a first optical condition in which the fiducial pattern 102 in the PLFP slide 101 is revealed in the image 104. In some instances, the data storage unit 111 stores absolute coordinates 105 generated by the coordinates generation subsystem 114.

An example slide scanning device 120 includes a camera/scanning module 127, an optical condition module 129, a user interface 123, a digital pathology application 121, and a data storage unit 125. In certain embodiments, the slide scanning device 120 is a microscope device. In certain embodiments, the slide scanning device 120 is a smart phone device, a personal computer (PC), a tablet device, or other user computing device. In some embodiments, the slide scanning device 120 communicates with the digital pathology system 110 via the network 130. In some embodiments, the digital pathology system 110 is a component of the digital pathology application 121.

The digital pathology application 121, in some embodiments, is associated with the digital pathology system 110 and the user downloads the digital pathology application 121 on the slide scanning device 120. For example, the user accesses an application store or a website of the digital pathology system 110 using the slide scanning device 120 and requests to download the digital pathology application 121 on the slide scanning device 120. The digital pathology application 121 operates on the slide scanning device 120 and enables a user of the slide scanning device 120 to examine a PLFP slide 101. Examining the PLFP slide 101 can include zooming in and out using a camera/scanning module 127 to view the PLFP slide 101 in a camera view 124 of the user interface 123, changing an optical condition to reveal or hide a fiducial pattern 102 on the PLFP slide 101, capturing one or more images of the PLFP slide 101 using the camera/scanning module 127, and/or selecting an LOI 106 on the PLFP slide 101. The digital pathology application 121 can communicate with the user interface 123 to receive one or more inputs from the user. The digital pathology application 121 can instruct the user interface 123 to display a camera view 124 of the PLFP slide 101. In some embodiments, the digital pathology application 121 communicates with one or more of the slide fiducial identification subsystem 112, the coordinates generation subsystem 114, the location query subsystem 116, or the data storage unit 111 of the digital pathology system 110. In certain embodiments, the digital pathology application 121 includes the slide fiducial identification subsystem 112, the coordinates generation subsystem 114, the location query subsystem 116 and performs the operations described herein as being performed by the subsystems 112, 114, and 116.

The user interface 123 can include a touchscreen display interface, a display device (e.g., a monitor) with a separate input device (e.g., a mouse), or other user interface 123 which can receive one or more inputs from the user and display information or provide other output to the user. For example, the user interface 123 can display a camera view 124 of an environment of the slide scanning environment (e.g., a view of a stage of the microscope) captured by the camera/scanning module 127. In some instances, the user interface 123 receives one or more inputs from the user, in some instances, to reveal or hide a fiducial pattern 102 on the PLFP slide 101 by changing an optical condition using the optical condition module 129, changing the camera view 124, capturing one or more images 104 of the PLFP slide 101 using the camera/scanning module 127, and/or selecting an LOI 106 on the PLFP slide 101 to request and then display coordinates 107 for the selected LOI 106.

The data storage unit 125 is accessible to the slide scanning device 120 and stores data for the slide scanning device 120. In some instances, the data storage unit 125 stores one or more images 104 captured by the camera/scanning module 127. In some instances, the slide scanning device 120 stores absolute coordinates 105 determined by the coordinates generation subsystem 114. In some instances, in which the digital pathology system 130 is separate from the slide scanning device 120, the data storage unit 125 is accessible to the digital pathology system 110 via the network 130. For example, the digital pathology system 110 can access data stored in the data storage unit 125 via the network 130.

As depicted in FIG. 1, the user of the slide scanning device 120 positions a pervasive location fiducial pattern (PLFP) slide 101 for viewing via the slide scanning device 120. As depicted in FIG. 1, the camera/scanning module 127 can capture an image 104 and/or provide a camera view 124 of the PLFP slide 101. In certain examples, the user can change, via the user interface 123, an optical condition of the slide scanning device 120 by selecting an optical condition from a set of optical conditions. One of the set of optical conditions that the user selects on the slide scanning device 120 enables the user to view, as depicted in FIG. 1, a fiducial pattern 102 on or in the PLFP slide 101, which is revealed only under the selected optical condition. For example, under optical conditions other than the selected optical condition, the fiducial pattern 102 is invisible in the camera view 124 and/or in images 104 captured of the PLFP slide 101. In certain examples, the user views the PLFP slide 101 at a first optical condition where the fiducial pattern 102 is hidden and then changes the first optical condition to a second optical condition, where the second optical condition is the particular optical condition that reveals the fiducial pattern 102 on the PLFP slide 101. In certain examples, the user identifies a location of interest (LOI) 106 on the PLFP slide 101 and the location query subsystem 116 determines coordinates for the LOI 106 based on the revealed fiducial pattern 102. In certain examples, the LOI 106 comprises a point or region on a sample being examined on the PLFP slide 101. For example, the revealed fiducial pattern 102 can comprise a coordinate grid or other coordinate system and the user identifies a precise coordinate for the LOI 106 based on the coordinate system of the revealed fiducial pattern 102. In some instances, the fiducial pattern 102 comprises a micro-patterned interface token object (ITO). In some instances, the fiducial pattern comprises a grid of QR codes, each of the QR codes encoding grid coordinates. FIG. 2 illustrates an example fiducial pattern 102 on a PLFP slide 101. In some instances, as depicted in FIG. 1, responsive to the user selecting the LOI 106 on the PLFP slide 101, the slide scanning device 120 displays coordinates 107 determined by the location query subsystem 116 for the selected LOI 106 and displays the coordinates 107 in the camera view 124. In some instances, the user can move a cursor in the camera view 124 and, for each position the user moves the cursor to in the camera view 124, the location query subsystem 116 determines coordinates 107 for the position for display in the camera view 124 and the slide scanning device 120 displays the coordinates 107 in the camera view 124.

The slide scanning device 120, including the slide fiducial identification subsystem 112, the coordinates generation subsystem 114, and the location query subsystem 116, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the slide scanning device 120 can be implemented using more or fewer systems or subsystems than those shown in FIG. 1, may combine two or more subsystems, or may have a different configuration or arrangement of the systems or subsystems.

Examples of Computer-Implemented Operations for Providing an Absolute Digital Coordinate System for Digital-Image-Based Slide Analysis Via a Slide Configured With an Optically-Revealable Pervasive Location Fiducial Pattern In the embodiments described herein, a pervasive location fiducial pattern (PLFP) slide 101 is configured with a fiducial pattern 102 that can enable a digital pathology system 110 to determine absolute coordinates 105 on the PLFP slide 101. The absolute coordinates 105 can be used to define coordinates 107 for a selected location of interest (LOI) 106 on the PLFP slide 101 and/or a selected LOI 106 in one or more of a camera view 124 of and/or image 104 of the PLFP slide 101. The absolute coordinates 105, which are used to define the LOI coordinates 107, do not vary according to which slide scanning device 120 is used to view the PLFP slide 101, according to how the user registers the PFLP slide 101 to the slide scanning device 120, or according to how the image 104 and/or camera view 124 of the slide is captured (e.g. camera zoom level, orientation, etc.).

FIG. 2 illustrates a PFLP slide 200 (e.g., PFLP slide 101) configured with a fiducial pattern 102 and illustrates the PLFP slide 200 viewed under an optical condition 201 to reveal a fiducial pattern 102. In some instances, responsive to receiving an input at the user interface 124, the optical condition module 129 of the slide scanning device 120 can change an optical condition of an environment of the PLFP slide 101 to the optical condition 201 from another optical condition. In some instances, responsive to receiving an input at the user interface 124, the optical condition module 129 of the slide scanning device 120 can change an optical condition of an environment of the PLFP slide 101 from another optical condition to the optical condition 201. In certain embodiments, changing the optical condition can include changing a focal plane of the PLFP slide 101, directing ultraviolet light ("UV") toward the PLFP slide 101, directing fluorescent light toward the of the PLFP slide 101, directing a visible light of a particular wavelength toward the of the PLFP slide 101, or other optical condition. As illustrated in FIG. 2, when viewed under the optical condition 201, the fiducial pattern can be viewed along with the sample (e.g., cells) that are on the PFLP slide 200.

FIGS. 3, 4, and 5 illustrate methods 300, 400, and 500 for determining coordinates 107 for a location of interest 106 on a PLFP slide 101 configured with an optically-revealable fiducial pattern 102. For example, FIG. 3 depicts a method 300 for a method for determining coordinates 107 for a location of interest 106 on a PFLP slide 101 configured with an optically-revealable fiducial pattern 102, according to certain embodiments disclosed herein. FIG. 4 depicts a method for determining, by a digital pathology system, coordinates for a location of interest in a camera view of a slide configured with an optically-revealable pervasive location fiducial pattern 102, according to certain embodiments disclosed herein. FIG. 5 depicts a method for determining, by a digital pathology system, coordinates for a location of interest in an image of a slide configured with an optically-revealable pervasive location fiducial pattern 102, according to certain embodiments described herein.

FIG. 3 depicts a method 300 for a method for determining coordinates 107 for a location of interest 106 on a PFLP slide 101 configured with an optically-revealable fiducial pattern 102, according to certain embodiments disclosed herein. One or more computing devices (e.g., the slide scanning device 120 or the individual subsystems contained therein)

implement operations depicted in FIG. 3. For illustrative purposes, the method 300 is described with reference to certain examples depicted in the figures. Other implementations, however, are possible.

At block 310, the method 300 involves determining a location of interest 106 on a pervasive location fiducial pattern (PLFP) slide 101 under a first optical condition, wherein the PLFP slide 101 comprises a fiducial pattern 102 configured to be revealed only under a second optical condition different from the first optical condition. For example, a user registers the PLFP slide 101 to a slide scanning device 120, for example, a microscope device. In some instances, registering the PLFP slide 101 to the slide scanning device 120 involves placing a drop of water to suspend a specimen between the PLFP slide 101 and a cover slip and then placing the prepared PLFP slide 101 on a stage of the slide scanning device 120. In certain examples, the LOI 106 comprises a region of interest (e.g., a region of a tissue sample) on the PLFP slide 101. In some instances, the first optical condition comprises a view of a first optical plane of the PLFP slide 101 and the second optical condition comprises a view of a second optical plane of the PLFP slide 101 different from the first optical plane. In other instances, the first optical condition comprises an absence of directed UV, fluorescent, or particular wavelength of visible light to the PFLP slide 101, respectively, and the second optical condition comprises an application of such UV, fluorescent, or particular wavelength of visible light to the PLFP slide 101, respectively.

At block 320, the method 300 involves changing the first optical condition to a second optical condition to reveal the fiducial pattern on the PLFP slide 101. In certain embodiments, the user performs one or more operations to change the optical condition from the first optical condition to the second optical condition. In certain embodiments, the slide scanning device 120, responsive to receiving an input of the user, performs one or more operations to change the optical condition on the PFLP slide 101 from the first optical condition to the second optical condition. For example, changing the optical condition comprises changing one or more of the focal planes, of the PLFP slide 101, causing UV light to be directed to the PLFP slide 101, causing fluorescent light to be directed to the PLFP slide 101, or causing a particular wavelength of visible light to be directed to the PLFP slide 101. For example, the slide scanning device 120 comprises a one or more components that are configured to change the optical condition from the first optical condition to the second optical condition. Example components could include a UV light source, a fluorescent light source, or a visible light source configured to emit light of a particular wavelength. In some instances, the component is configured to change a focal plane of the slide scanning device 120 from a first focal plane associated with the first optical condition to a second focal plane associated the second optical condition.

At block 330, the method 300 involves determining coordinates 107 of the location of interest (LOI) 106 based on the revealed fiducial pattern 102 on the PLFP slide 101. For example, the fiducial pattern 102 on the PLFP slide 101 comprises a micro-patterned interface token objects (ITOs) encoded in the PLFP slide. In an example, the fiducial pattern comprises absolute coordinates 105 comprising a set of quick response (QR) codes arranged (e.g., tiled) across an area on the PLFP slide, each of the QR codes including its own specific grid coordinates. In some instances, the user identifies the QR code identifier for the QR code in which the LOI 106 is located and also grid coordinates within the QR code that are closest to the LOI 106. In some instances, the LOI coordinates 107 comprise a single point on the PFLP slide 101 identified in terms on the absolute coordinates 105 (e.g., a QR code identifier and grid coordinate location within the identified QR code). In some instances, the LOI coordinates 107 define an area on the PFLP slide 101 identified in terms on the absolute coordinates 105. For example, the area comprises a rectangular area defined by two corners on the PLFP slide 101 defining the rectangular area, a circular area defined by a point on the PFLP slide 101 and a defined radius from the point, or other area that is defined using the absolute coordinates 105 defined by the revealed fiducial pattern 102.

FIG. 4 depicts a method 400 for determining, by a digital pathology system 110, coordinates 107 for a location of interest in a camera view 124 of a slide configured with an optically-revealable pervasive location fiducial pattern 102, according to certain embodiments described herein. One or more computing devices (e.g., the slide scanning device 120 or the individual subsystems contained therein) implement operations depicted in FIG. 4. For illustrative purposes, the method 400 is described with reference to certain examples depicted in the figures. Other implementations, however, are possible.

At block 410, the method 400 involves receiving, by a digital pathology system 110 via a user interface 123, a selection of a location of interest (LOI) 106 in a camera view 124 of a pervasive location fiducial pattern (PLFP) slide 101 viewed under a first optical condition, wherein the PLFP slide 101 comprises a fiducial pattern 102 configured to be revealed only under a second optical condition different from the first optical condition. For example, a user registers the PLFP slide 101 to a slide scanning device 120, for example, a microscope device. In some instances, registering the PLFP slide 101 to the slide scanning device 120 involves placing a drop of water to suspend a specimen between the PLFP slide 101 and a cover slip and then placing the prepared PLFP slide 101 on a stage of the slide scanning device 120. In certain examples, the LOI 106 comprises a region of interest (e.g., a region of a tissue sample) on the PLFP slide 101. In some instances, the first optical condition comprises a view of a first optical plane of the PLFP slide 101 and the second optical condition comprises a view of a second optical plane of the PLFP slide 101 different from the first optical plane. In other instances, the first optical condition comprises an absence of directed UV, fluorescent, or particular wavelength of visible light to the PFLP slide 101, respectively, and the second optical condition comprises an application of such UV, fluorescent, or particular wavelength of visible light to the PLFP slide 101, respectively. The slide scanning device 120 captures, via a camera/scanning module 127, a camera view 124 of the PLFP slide 101 and displays the camera view 124 via a user interface 123 of the slide scanning device 120 or via a user interface of another device (e.g., a user computing device) communicatively coupled to the slide scanning device 120.

In some instances, to select the LOI 106, the user selects, via the user interface 123 within the camera view 124, a point or area of the camera view 124 corresponding to the LOI 106. For example, the user wants to locate a particular region of tissue on the PLFP slide 101 and selects, within the camera view 124, a point or area corresponding to the particular region. For example, the user can define, via the user interface 123 a LOI 106 by defining two corners of a rectangular region, defining a center and radius of a circular region, or by selecting a single point within the camera view 124. The digital pathology system 110 receives the selection of the LOI 106 input via the user interface 123 of the slide scanning device 120.

At block 420, the method 400 involves changing, by the digital pathology system 110 responsive to receiving a request, optical conditions from the first optical condition to the second optical condition to reveal the fiducial pattern 102 on the PFLP slide 101. In certain embodiments, the slide scanning device 120, responsive to receiving an input of the user, performs one or more operations to change the optical condition on the PFLP slide 101 from the first optical condition to the second optical condition. For example, changing the optical condition comprises changing one or more of the focal planes of the PLFP slide 101, causing UV light to be directed to the PLFP slide 101, causing fluorescent light to be directed to the PLFP slide 101, or causing a particular wavelength of visible light to be directed to the PLFP slide 101. For example, the slide scanning device 120 comprises a one or more components that are configured to change the optical condition from the first optical condition to the second optical condition. Example components could include a UV light source, a fluorescent light source, or a visible light source configured to emit light of a particular wavelength. In some instances, the component is configured to change a focal plane of the slide scanning device 120 from a first focal plane associated with the first optical condition to a second focal plane associated the second optical condition. In the example method illustrated in FIG. 4, block 420 is performed after block 410. In some instances, however, block 420 is performed prior to block 410. For example, digital pathology system 110 receives the selection of the LOI 106 input via the user interface 123 (e.g., the steps of block 410) after the fiduciary pattern 102 on the PLFP slide 101 is revealed under the second optical condition (e.g., the steps of block 420).

At block 430, the method 400 involves determining, by the digital pathology system 110, coordinates 107 for the location of interest (LOI) 106 based on the revealed fiducial pattern 102 on the PLFP slide 101. For example, the fiducial pattern 102 on the PLFP slide 101 comprises a micro-patterned interface token objects (ITOs) encoded in the PLFP slide. In an example, the fiducial pattern comprises absolute coordinates 105 comprising a set of quick response (QR) codes arranged (e.g., tiled) across an area on the PFLP slide, each of the QR codes including its own specific grid coordinates. In some instances, the user identifies the QR code identifier for the QR code in which the LOI 106 is located, as well as grid coordinates within the QR code that are closest to the LOI 106. In some instances, the LOI coordinates 107 comprise a single point on the PFLP slide 101 identified in terms on the absolute coordinates 105 (e.g., a QR code identifier and grid coordinate location within the identified QR code). In some instances, the LOI coordinates 107 define an area on the PFLP slide 101 identified in terms on the absolute coordinates 105. For example, the area comprises a rectangular area defined by two corners on the PLFP slide 101 defining the rectangular area, a circular area defined by a point on the PFLP slide 101 and a defined radius from the point, or other area that is defined using the absolute coordinates 105 defined by the revealed fiducial pattern 102.

At block 440, the method 400 involves displaying, by the digital pathology system 110 in the camera view 124, the determined coordinates 107. In some instances, the digital pathology system 110 displays, via the user interface 123 in the camera view 124, the determined LOI coordinates 107 responsive to receiving the selection of the LOI 106 in the camera view 124. For example, the determined coordinates can comprise a QR code identifier associated with the QR code in the fiduciary pattern 102 that encompasses the LOI 106 and coordinates identifying a specific location within the QR code. In some instances, the digital pathology system 110 displays a user interface object at the LOI 106 in the camera view 124 to indicate the LOI 106 in the camera view 124.

FIG. 5 depicts a method 500 for determining, by a digital pathology system 110, coordinates 107 for a location of interest 106 in a camera view 124 of a slide 101 configured with an optically-revealable pervasive location fiducial pattern 102, according to certain embodiments described herein. One or more computing devices (e.g., the slide scanning device 120 or the individual subsystems contained therein) implement operations depicted in FIG. 5. For illustrative purposes, the method 500 is described with reference to certain examples depicted in the figures. Other implementations, however, are possible.

In the example described in FIG. 5, the digital pathology system 110 accesses a first image of a PLFP slide 101 captured under a first optical condition and a corresponding second image of the PLFP slide 101 captured under a second optical condition having the revealed fiduciary pattern. Based on the fiduciary pattern 102 in the second image, the digital pathology system can determine absolute coordinates 105 for defining any LOI 106 selected within the first image. Responsive to receiving a selection of a LOI 106 in the first image, the digital pathology system 110 can determine LOI coordinates 107 for the selected LOI 106 in the first image from the absolute coordinates 105.

At block 510, the method 500 involves receiving, by a digital pathology system 110, a first image 104 of a pervasive location fiducial pattern (PLFP) slide 101 captured under a first optical condition, wherein the PLFP slide 101 comprises a fiducial pattern 102 configured to be revealed only in images captured under a second optical condition different from the first optical condition. For example, a user registers the PLFP slide 101 to the slide scanning device 120, for example, a microscope device. In some instances, registering the PLFP slide 101 to the slide scanning device 120 involves placing a drop of water to suspend a specimen between the PLFP slide 101 and a cover slip and then placing the prepared PFLP slide 101 on a stage of the slide scanning device 120. In some instances, the user can view the PFLP slide 101 through a camera view 124 captured by a camera/scanning module 127 of the slide scanning device 120 and the camera/scanning module 127 of the slide scanning device 120, responsive to receiving one or more inputs from the user, can capture one or more images in the camera view 124 of the PLFP slide 101. The digital pathology system 110 receives or otherwise accesses the one or more captured images captured by the camera/scanning module 127.

At block 520, the method 500 involves accessing, by the digital pathology system 110, a second image 104 of the PLFP slide captured under the second optical condition, the second image 104 depicting the revealed fiducial pattern 102 on the PLFP slide 101. For example, the slide scanning device 120, responsive to receiving a request, can change optical conditions on the PLFP slide 101 from the first optical condition to the second optical condition to reveal the fiducial pattern 102 on the PFLP slide 101. In certain embodiments, the slide scanning device 120, responsive to receiving an input of the user, performs one or more operations to change the optical condition on the PFLP slide 101 from the first optical condition to the second optical condition. For example, changing the optical condition comprises changing one or more of the focal planes of the PLFP slide 101, causing UV light to be directed to the PLFP slide 101, causing fluorescent light to be directed to the PLFP slide 101, or causing a particular wavelength of visible light to be directed to the PLFP slide 101. For example, the slide scanning device 120 comprises a one or more components that are configured to change the optical condition from the first optical condition to the second optical condition. Example components could include a UV light source, a fluorescent light source, or a visible light source configured to emit light of a particular wavelength. In some instances, the component is configured to change a focal plane of the slide scanning device 120 from a first focal plane associated with the first optical condition to a second focal plane associated the second optical condition.

At block 540, the method 500 involves receiving, by the digital pathology system 110 via a user interface 123 displaying the first image, a selection of a location of interest (LOI) 106 in the first image. In some instances, the digital pathology system 110 displays, on a user interface 123 of the scanning computing device 120, the first image captured of the PLFP slide 101. In some instances, the digital pathology system 110 displays the first image captured of the PFLP slide 101 on a computing device other than the scanning computing device 120. For example, the digital pathology system 110 receives a selection, via a user interface 123 of the slide scanning device 120 (or the user computing device), a selection of the LOI 106. In some instances, the LOI 106 comprises a point or defined area in the first image. The point could be a single selected pixel of the first image. The defined area can encompass an area of the first image. In some instances, the area is a rectangular area, and the selection comprises a selection of two opposite corner pixels of the rectangular area. In some instances, the area is a circular area, and the selection comprises a selection of a pixel of the center of the circular area and a selection of a length for a radius of the circular area. The selection can include receiving a touch input to the user interface or an input via a cursor or other user interface object.

At block 540, the method 500 involves determining, by the digital pathology system 110 coordinates 107 for the selected LOI 106 in the first image based on the revealed fiducial pattern 102 in the second image. For example, the first image and the second image are the same except for the optical conditions under which the respective image of the PLFP slide 101 was captured. For example, the first image is a captured image of the PLFP slide 101 without the fiducial pattern 102 revealed in the image and the second image is a captured image of the PLFP slide 101 that is equivalent to the first image except the fiducial pattern 102 is revealed in the PFLP slide 101 and, therefore, is also revealed in the second image of the PLFP slide 101. For example, the digital pathology system 110, for pixel(s) corresponding to the selected LOI 106, a location for the corresponding pixel(s) in the second image defined in terms of the absolute coordinates 105 specified in the fiducial pattern 102 revealed in the second image. For example, the absolute coordinates 105 of the fiducial pattern 102 comprise a set of arranged QR codes and, for each QR code, a set of coordinates defining a location within the respective QR code. In some instances, the location associated with the corresponding pixel comprises a QR code identifier identifying a particular QR code of an arrangement of QR codes in the fiduciary pattern 102 in which the pixel is located in addition to coordinates (e.g., x, y coordinates) identifying a specific location of the pixel within the identified particular QR code In certain embodiments, the digital pathology system 110, prior to determining the LOI coordinates 107, defines coordinates for each pixel of the first image based on the revealed fiducial pattern 102 in the second image. The digital pathology system 110 stores the predefined coordinates in the data storage unit 111. The digital pathology system 110, responsive to receiving the selection of the LOI 106 (point or area) in the first image, determines the LOI coordinates 107 by retrieving the predefined coordinates corresponding to the pixel(s) associated with the selected LOI 106. For example, determining the coordinates includes defining, for each pixel of the first image, a location based on the absolute coordinates 105 of the fiducial pattern 102 revealed in the second image. For example, the digital pathology system 110, for each pixel of the first image determines, for the corresponding pixel in the second image, a location defined in terms of the absolute coordinates 105 specified in the fiducial pattern 102 revealed in the second image.

At block 550, the method 500 involves displaying, by the digital pathology system 110 via the user interface 123, the determined coordinates 107 for the LOI 106. In some instances, the digital pathology system 110 displays, via the user interface 123 in the camera view 124, the determined LOI coordinates 107 responsive to receiving the selection of the LOI 106 in the first image. For example, the determined coordinates can comprise a QR code identifier associated with the QR code in the fiduciary pattern 102 that encompasses the LOI 106 and coordinates identifying a specific location within the QR code. In some instances, the digital pathology system 110 superimposes, inserts, or otherwise displays a user interface object at the LOI 106 in the first image to indicate the LOI 106 in the first image.

Examples of Computing Environments for Implementing Certain Embodiments

Figure 6:
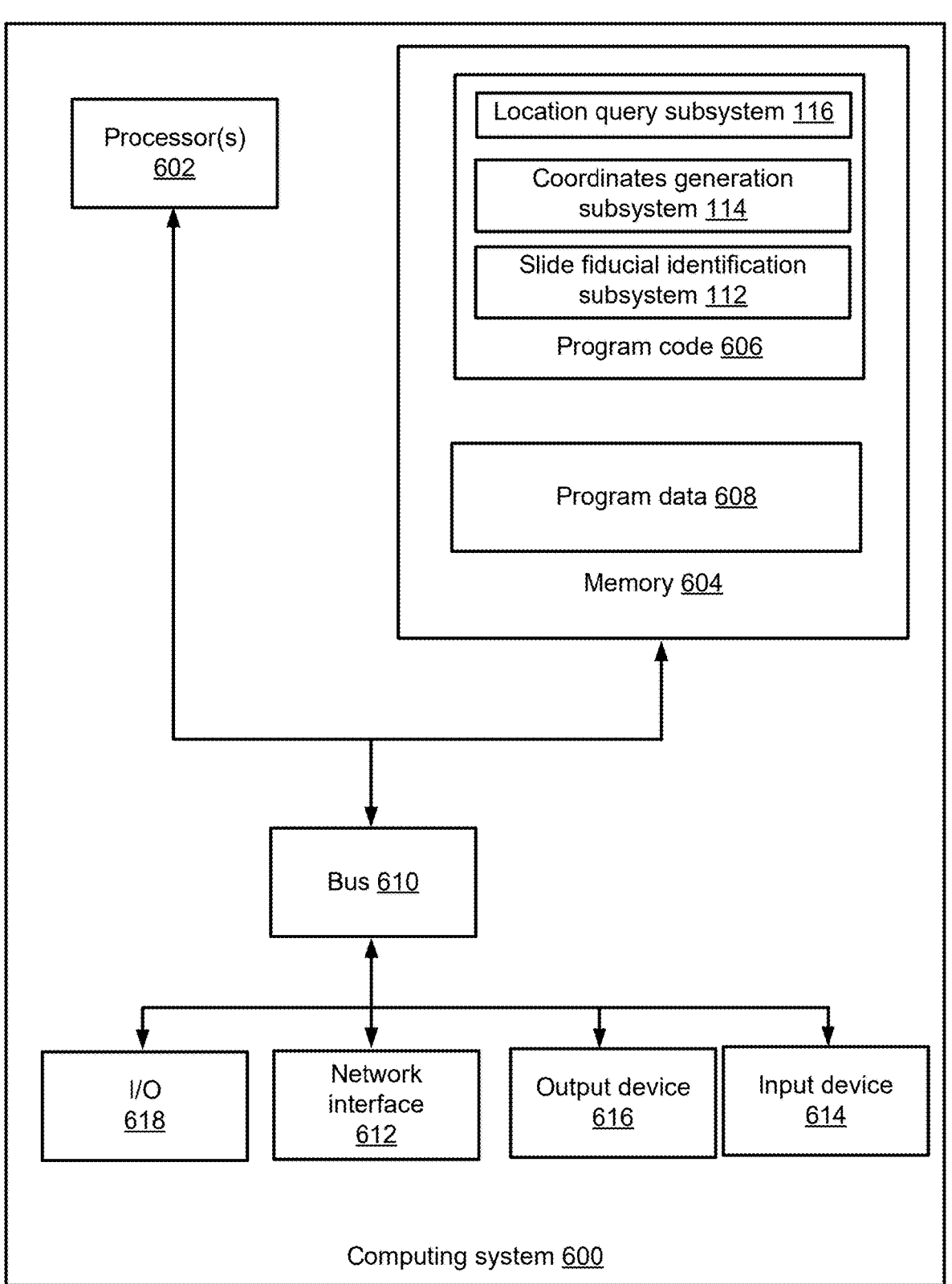
FIG. 6 depicts an example of a computing system that performs certain operations described herein, according to certain embodiments disclosed herein.

Any suitable computer system or group of computer systems can be used for performing the operations described herein. For example, FIG. 6 depicts an example of a computer system 600. The depicted example of the computer system 600 includes a processing device 602 communicatively coupled to one or more memory components 604. The processing device 602 executes computer-executable program code stored in the memory components 604, accesses information stored in the memory component 604, or both. Execution of the computer-executable program code causes the processing device to perform the operations described herein. Examples of the processing device 602 include a microprocessor, an application-specific integrated circuit ("ASIC"), a field-programmable gate array ("FPGA"), or any other suitable processing device. The processing device 602 can include any number of processing devices, including a single processing device.

The memory components 604 includes any suitable non-transitory computer-readable medium for storing program code 606, program data 608, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 1204 can be volatile memory, non-volatile memory, or a combination thereof.

The computer system 600 executes program code 606 that configures the processing device 602 to perform one or more of the operations described herein. Examples of the program code 606 include, in various embodiments, the digital pathology system 110 (including the slide fiducial identification subsystem 112, the coordinates generation subsystem 114, and the location query subsystem 116) of FIG. 1, which may include any other suitable systems or subsystems that perform one or more operations described herein (e.g., one or more neural networks, encoders, attention propagation subsystem and segmentation subsystem). The program code 1206 may be resident in the memory components 604 or any suitable computer-readable medium and may be executed by the processing device 602 or any other suitable processor.

The processing device 602 is an integrated circuit device that can execute the program code 606. The program code 606 can be for executing an operating system, an application system or subsystem, or both. When executed by the processing device 602, the instructions cause the processing device 602 to perform operations of the program code 606. When being executed by the processing device 602, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 604 store the program data 1208 that includes one or more datasets described herein. In some embodiments, one or more of data sets are stored in the same memory component (e.g., one of the memory components 604). In additional or alternative embodiments, one or more of the programs, data sets, models, and functions described herein are stored in different memory components 604 accessible via a data network. One or more buses 610 are also included in the computer system 600. The buses 610 communicatively couple one or more components of a respective one of the computer system 600.

In some embodiments, the computer system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computer system 600 is able to communicate with one or more other computing devices via a data network using the network interface device 612.

The computer system 600 may also include a number of external or internal devices, an input device 614, a presentation device 616, or other input or output devices. For example, the computer system 600 is shown with one or more input/output ("I/O") interfaces 618. An I/O interface 618 can receive input from input devices or provide output to output devices. An input device 614 can include any device or group of devices suitable for receiving visual, auditory, or other suitable input that controls or affects the operations of the processing device 602. Non-limiting examples of the input device 614 include a touchscreen, a mouse, a keyboard, a microphone, a separate mobile computing device, etc. A presentation device 616 can include any device or group of devices suitable for providing visual, auditory, or other suitable sensory output. Non-limiting examples of the presentation device 616 include a touchscreen, a monitor, a speaker, a separate mobile computing device, etc.

Although FIG. 6 depicts the input device 614 and the presentation device 616 as being local to the computer system 600, other implementations are possible. For instance, in some embodiments, one or more of the input devices 614 and the presentation device 616 can include a remote client-computing device that communicates with computing system 600 via the network interface device 612 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 7:
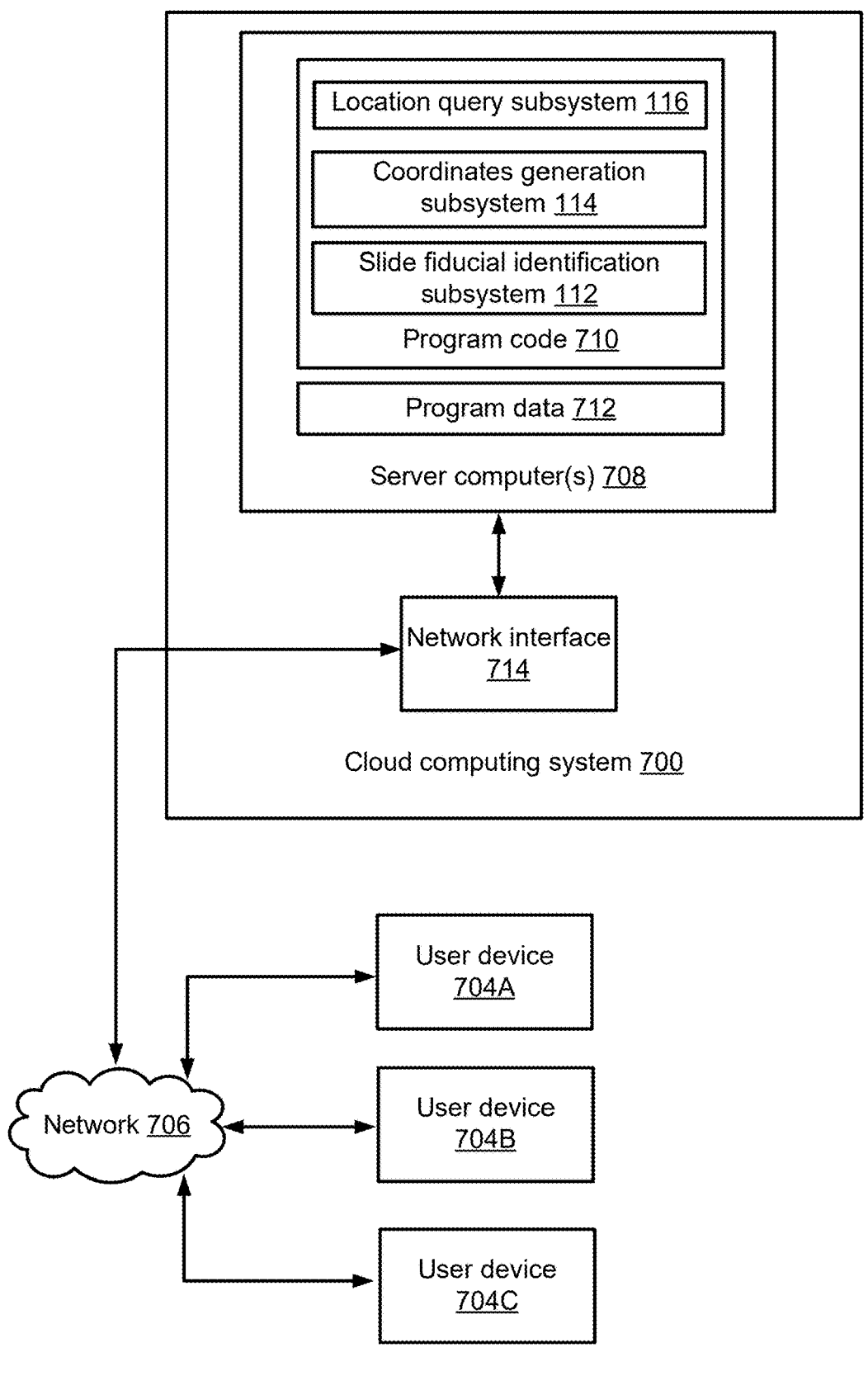
FIG. 7 depicts an example of a cloud computing system that performs certain operations described herein, according to certain embodiments disclosed herein.

In some embodiments, the functionality provided by computer system 600 may be offered as cloud services by a cloud service provider. For example, FIG. 7 depicts an example of a cloud computer system 700 offering a service for providing coordinates 107 for a selected LOI 106 in an image 104 or camera view 124 of a PLFP slide 101 viewed via a slide scanning device 120, that can be used by a number of user subscribers using user devices 704A, 704B, and 704C across a data network 706. The cloud computer system 700 performs the processing to provide the service for providing coordinates 107 for a selected LOI 106 in an image 104 or camera view 124 of a PLFP slide 101 viewed via a slide scanning device 120. The cloud computer system 700 may include one or more remote server computers 708.

The remote server computers 708 include any suitable non-transitory computer-readable medium for storing program code 710 (e.g., slide fiducial identification subsystem 112, the coordinates generation subsystem 114, and the location query subsystem 116 of FIG. 1) and program data 712, or both, which is used by the cloud computer system 700 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and Action-Script. In various examples, the server computers 1208 can include volatile memory, non-volatile memory, or a combination thereof.

One or more of the server computers 708 execute the program code 710 that configures one or more processing devices of the server computers 708 to perform one or more of the operations that execute a service for providing coordinates 107 for a selected LOI 106 in an image 104 or camera view 124 of a PLFP slide 101 viewed via a slide scanning device 120. As depicted in the embodiment in FIG. 7, the one or more servers providing the service for providing coordinates 107 for a selected LOI 106 in an image 104 or camera view 124 of a PLFP slide 101 viewed via a slide scanning device 120 may implement the slide fiducial identification subsystem 112, the coordinates generation subsystem 114, and the location query subsystem 116. Any other suitable systems or subsystems that perform one or more operations described herein (e.g., one or more development systems for configuring an interactive user interface) can also be implemented by the cloud computer system 700.

In certain embodiments, the cloud computer system 700 may implement the services by executing program code and/or using program data 712, which may be resident in a memory component of the server computers 708 or any suitable computer-readable medium and may be executed by the processing devices of the server computers 708 or any other suitable processing device.

In some embodiments, the program data 712 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 706.

The cloud computer system 700 also includes a network interface device 714 that enable communications to and from cloud computer system 700. In certain embodiments, the network interface device 714 includes any device or group of devices suitable for establishing a wired or wireless data connection to the data networks 706. Non-limiting examples of the network interface device 714 include an Ethernet network adapter, a modem, and/or the like. The service for providing coordinates 107 for a selected LOI 106 in an image 104 or camera view 124 of a PLFP slide 101 viewed via a slide scanning device 120 is able to communicate with the user devices 704A, 704B, and 704C via the data network 706 using the network interface device 714.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method, comprising:
receiving, by one or more computing devices via a user interface of a slide scanning device, a selection of a location of interest (LOI) in a camera view of a pervasive location fiducial pattern (PLFP) slide viewed, via the slide scanning device, using a first optical condition, wherein the PLFP slide comprises a fiducial pattern viewable, via the slide scanning device, using a second optical condition different from the first optical condition, wherein the fiducial pattern comprises a machine readable code on or in the PLFP slide defining an absolute coordinate system for the PLFP slide;
responsive to receiving a request, changing, by the one or more computing devices, optical conditions such that the PLFP slide is viewed in the camera view at the second optical condition instead of the first optical condition, wherein the fiducial pattern is revealed on the PLFP slide;
determining, by the one or more computing devices, coordinates of the selection of the LOI based on the fiducial pattern on the PLFP slide; and
displaying, by the one or more computing device in the camera view, the determined coordinates, wherein the determined coordinates of the LOI comprise coordinates defining the LOI according to the absolute coordinate system.

2. The method of claim 1, wherein the user interface comprises a user interface of the slide scanning device.

3. The method of claim 1, wherein the user interface comprises a user interface of a user computing device, wherein the user computing device is separate from the slide scanning device.

4. The method of claim 1, wherein the slide scanning device comprises a microscope, wherein the PLFP slide is registered to a stage of the microscope, and wherein the camera view comprises a view of a camera of the microscope.

5. The method of claim 1, wherein the first optical condition comprises a first focal plane of the slide scanning device and the second optical condition comprises a second focal plane of the slide scanning device, wherein changing the optical conditions comprises causing the slide scanning device to change focal planes from the first focal plane to the second focal plane.

6. The method of claim 1, wherein the first optical condition comprises an absence of light from a light source applied to the PLFP slide, wherein the second optical condition comprises application of the light from the light source to the PLFP slide, changing the optical conditions comprises causing the light source to emit the light.

7. The method of claim 6, wherein the light source comprises an ultraviolet (UV) light source, a fluorescent light source, or a light source configured to emit visible light of a particular wavelength.

8. The method of claim 1, wherein the machine readable code comprises a set of quick-response (QR) codes,
wherein each QR code of the set of QR codes:
is associated with a respective QR code identifier, and
defines QR-code coordinates within a respective area of the QR code,
wherein the coordinates of the LOI comprise a QR code identifier associated with a particular QR code encompassing the LOI and particular QR-code coordinates defining a specific location of the LOI within the particular QR code.

9. A system comprising:
a memory component; and
a processing device coupled to the memory component, the processing device to perform operations comprising:
receiving, via a user interface of a slide scanning device, a selection of a location of interest (LOI) in a camera view of a pervasive location fiducial pattern (PLFP) slide viewed, via the slide scanning device, using a first optical condition, wherein the PLFP slide comprises a fiducial pattern viewable, via the slide scanning device, using a second optical condition different from the first optical condition, wherein the fiducial pattern comprises a machine readable code on or in the PLFP slide defining an absolute coordinate system for the PLFP slide;
responsive to receiving a request, changing, optical conditions such that the PLFP slide is viewed in the camera view at the second optical condition instead of the first optical condition, wherein the fiducial pattern is revealed on the PLFP slide;
determining coordinates of the selection of the LOI based on the fiducial pattern on the PLFP slide; and
displaying, in the camera view, the determined coordinates, wherein the determined coordinates of the LOI comprise coordinates defining the LOI according to the absolute coordinate system.

10. The system of claim 9, wherein the slide scanning device comprises a microscope, wherein the PLFP slide is registered to a stage of the microscope, and wherein the camera view comprises a view of a camera of the microscope.

11. The system of claim 9, wherein the first optical condition comprises a first focal plane of the slide scanning device and the second optical condition comprises a second focal plane of the slide scanning device, wherein changing the optical conditions comprises causing the slide scanning device to change focal planes from the first focal plane to the second focal plane.

12. The system of claim 9, wherein the first optical condition comprises an absence of light from a light source applied to the PLFP slide, wherein the second optical condition comprises application of the light from the light source to the PLFP slide, changing the optical conditions comprises causing the light source to emit the light.

13. The system of claim 12, wherein the light source comprises an ultraviolet (UV) light source, a fluorescent light source, or a light source configured to emit visible light of a particular wavelength.

14. The system of claim 9, wherein the machine readable code comprises a set of quick-response (QR) codes, wherein each QR code of the set of QR codes:

is associated with a respective QR code identifier, and defines QR-code coordinates within a respective area of the QR code, wherein the coordinates of the LOI comprise a QR code identifier associated with a particular QR code encompassing the LOI and particular QR-code coordinates defining a specific location of the LOI within the particular QR code.

15. A non-transitory computer-readable medium storing executable instructions, which when executed by a processing device, cause the processing device to perform operations comprising:

receiving, via a user interface of a slide scanning device, a selection of a location of interest (LOI) in a camera view of a pervasive location fiducial pattern (PLFP) slide viewed, via the slide scanning device, using a first optical condition, wherein the PLFP slide comprises a fiducial pattern viewable, via the slide scanning device, using a second optical condition different from the first optical condition, wherein the fiducial pattern comprises a machine readable code on or in the PLFP slide defining an absolute coordinate system for the PLFP slide;

responsive to receiving a request, changing, optical conditions such that the PLFP slide is viewed in the camera view at the second optical condition instead of the first optical condition, wherein the fiducial pattern is revealed on the PLFP slide;

determining coordinates of the selection of the LOI based on the fiducial pattern on the PLFP slide; and displaying, in the camera view, the determined coordinates, wherein the determined coordinates of the LOI comprise coordinates defining the LOI according to the absolute coordinate system.

16. The non-transitory computer-readable medium of claim 15, wherein the machine readable code comprises a set of quick-response (QR) codes, wherein each QR code of the set of QR codes:

is associated with a respective QR code identifier, and defines QR-code coordinates within a respective area of the QR code, wherein the coordinates of the LOI comprise a QR code identifier associated with a particular QR code encompassing the LOI and particular QR-code coordinates defining a specific location of the LOI within the particular QR code.

17. The non-transitory computer-readable medium of claim 15, wherein the slide scanning device comprises a microscope, wherein the PLFP slide is registered to a stage of the microscope, and wherein the camera view comprises a view of a camera of the microscope.

\* \* \* \* \*